(12) United States Patent
Tseng et al.

(10) Patent No.: US 9,489,905 B2
(45) Date of Patent: Nov. 8, 2016

(54) DISPLAY DEVICE DRIVING METHOD

(75) Inventors: Kuo-Yang Tseng, Tainan (TW);
Chih-Hao Chen, Tainan (TW);
Cheng-Lung Chiang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 852 days.

(21) Appl. No.: 13/366,528

(22) Filed: Feb. 6, 2012

(65) Prior Publication Data

US 2013/0201163 A1 Aug. 8, 2013

(51) Int. Cl.
*G09G 3/36* (2006.01)
*G02F 1/1362* (2006.01)

(52) U.S. Cl.
CPC ....... *G09G 3/3648* (2013.01); *G02F 1/136286* (2013.01); *G09G 2320/0223* (2013.01)

(58) Field of Classification Search
CPC ..................... G09G 3/364; G09G 2320/0223; G02F 1/136286
USPC .................................................. 345/100, 87
See application file for complete search history.

(56) References Cited

U.S. PATENT DOCUMENTS

| 6,037,248 | A  | * | 3/2000 | Ahn .............................. 438/619 |
| 7,777,713 | B2 | * | 8/2010 | Hashimoto et al. .......... 345/100 |
| 2004/0036816 | A1 | * | 2/2004 | Yun ................................. 349/43 |
| 2006/0176264 | A1 | * | 8/2006 | Go ................................ 345/100 |

FOREIGN PATENT DOCUMENTS

TW 201129962 9/2011

OTHER PUBLICATIONS

English translation of abstract of TW 201129962 (published Sep. 1, 2011).

* cited by examiner

*Primary Examiner* — Chanh Nguyen
*Assistant Examiner* — Yuzhen Shen
(74) *Attorney, Agent, or Firm* — McClure, Qualey & Rodack, LLP

(57) ABSTRACT

A display device driving method is provided. The display device driving method comprises the steps outlined below. A display device is provided, in which each of the first gate lines of a driving circuit of the display device has a first RC value and each of the second gate lines of the drive circuit has a second RC value smaller than the first RC value. A first gate driving signal having a first pulse width is generated to each of the first gate lines to drive corresponding first pixel rows. A second gate driving signal having a second pulse width is generated to each of the second gate lines to drive corresponding second pixel rows, wherein the second pulse width is smaller than the first pulse width.

8 Claims, 4 Drawing Sheets

DISPLAY DEVICE DRIVING METHOD

BACKGROUND

1. Technical Field

The present invention relates to a display technology. More particularly, the present invention relates to a display device driving method.

2. Description of Related Art

Display device is an essential part of the electronic system and is widely used in the electronic devices such as cell phone, personal digital assistant (PDA), laptop and personal computer, etc. Usually, a driving circuit is used to drive a pixel array of the display device. A common driving circuit comprises a plurality of gate lines and data lines, in which the gate lines are for turning on a row of pixels on the pixel array so that display data can be transmitted to the pixels through the data lines.

In order to allow the user to take the device easily with them, the design trend of the display device tends to make the size of the display device smaller. However, there are a number of technology challenges presented when the size of the display device becomes smaller. For example, the widths between the gate lines cannot be too large. The slight mismatch between the gate lines may greatly affect the driving of the pixels as well.

Accordingly, what is needed is a display device driving method to overcome the above issue. The present disclosure addresses such a need.

SUMMARY

An aspect of the present disclosure is to provide a display device driving method. The display device driving method comprises the steps outlined below. A display device comprising a pixel array and a driving circuit is provided, wherein the driving circuit comprises a plurality of first gate lines connected to a plurality of first pixel rows on the pixel array and a plurality of second gate lines connected to a plurality of second pixel rows on the pixel array, in which each of the first gate lines has a first RC value and each of the second gate lines has a second RC value smaller than the first RC value. A first gate driving signal having a first pulse width is generated to each of the first gate lines to drive the first pixel rows. A second gate driving signal having a second pulse width is generated to each of the second gate lines to drive the second pixel rows, wherein the second pulse width is smaller than the first pulse width.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
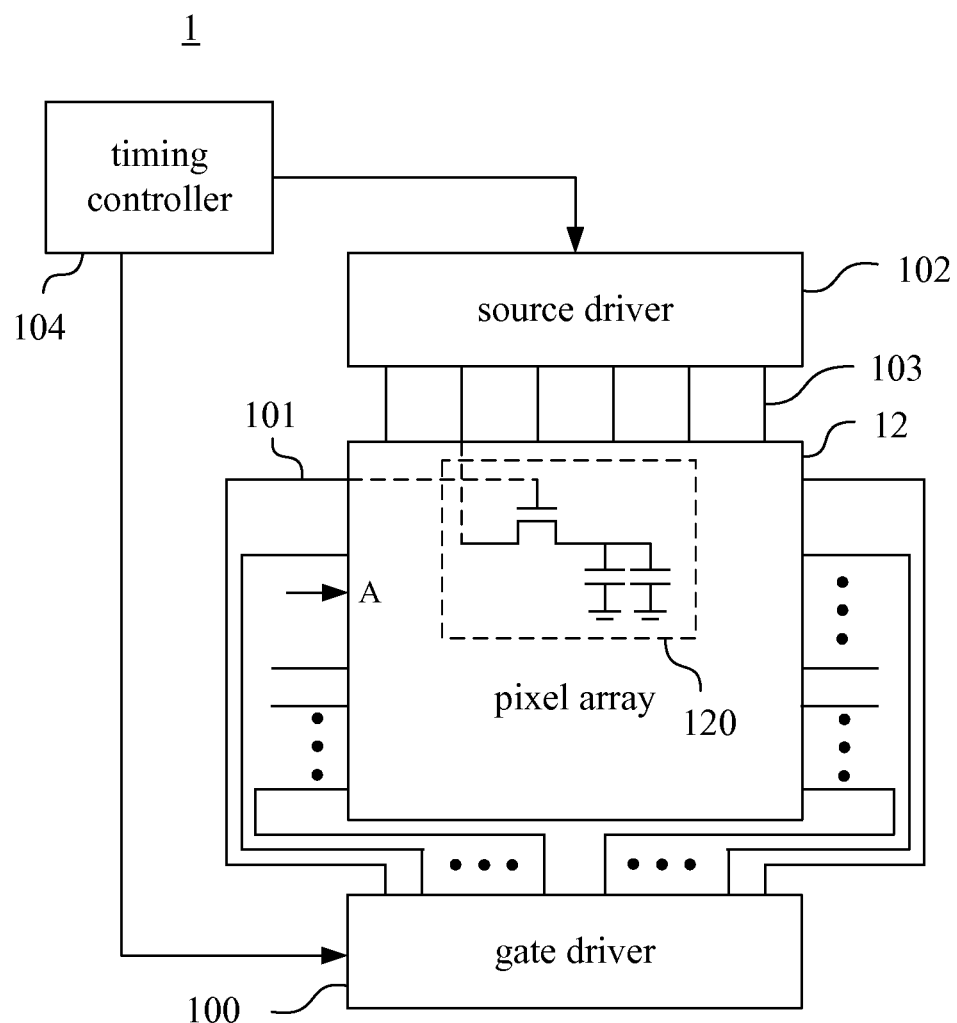
FIG. 1 is a block diagram of a display device of an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram of a display device 1 of an embodiment of the present disclosure. The display device 1 comprises a driving circuit and a pixel array 12.

The driving circuit comprises a gate driver 100, a source driver 102 and a timing controller 104. The gate driver 100 is connected to the pixel array 12 through a plurality of gate lines 101 and the source driver 102 is connected to the pixel array 12 through a plurality of data lines 103. The gate driver 100 generates a gate driving signal to the pixel array 12 under the control of the timing controller 104. Similarly, the source driver 102 generates a data signal to the pixel array 12 under the control of the timing controller 104.

The pixel array 12 comprises a plurality of pixel rows each having a plurality of pixels 120. Each of the pixels 120 comprises a transistor having a gate connected to one of the gate lines 101 and a source connected to one of the data lines 103. When a gate driving signal is transmitted from the gate driver 100 through the corresponding gate line 101 to the pixel, the transistor is turned on to receive the data signal from the corresponding data line 103. The gate driver 100 sequentially makes each row of the pixels turn on to receive the data signal in a scan period such that the pixel array 12 is able to display a frame.

Figure 2:
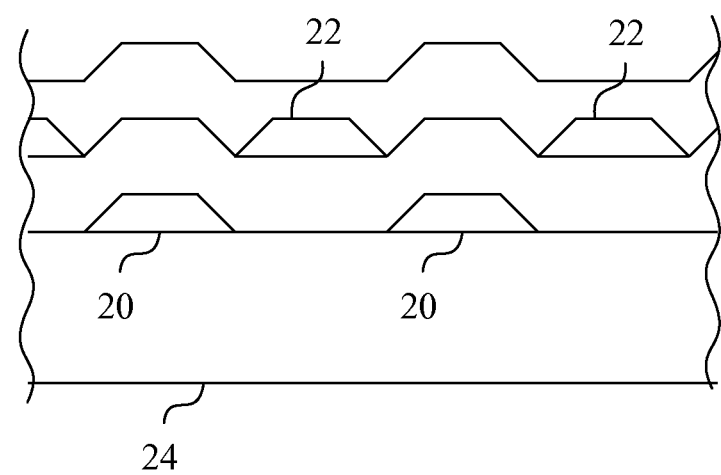
FIG. 2 is a partial cross-sectional view of a pixel array through a direction A in FIG. 1 in an embodiment of the present disclosure.

FIG. 2 is a partial cross-sectional view of the pixel array 12 through the direction A in FIG. 1 in an embodiment of the present disclosure. In order to make the display device smaller, a plurality of first gate lines 20 and a plurality of second gate lines 22 are used. In the present embodiment, the first gate lines 20 are formed on a layer 24 where the pixel array 12 is formed, and the second gate lines 22 are further formed on a layer above the first gate lines 20. Accordingly, the first gate lines 20 and the second gate lines 22 are formed on different layers on the pixel array 12. Further, each the first gate lines 20 is an odd gate line and each of the second gate lines 22 is an even gate line in the present disclosure. The first and the second gate lines 20 and 22 are thus interlaced with each other. Hence, the width D between the first and the second gate lines 20 and 22 can be kept very small since they are in the different layers. It is noted that in other embodiments, each the first gate lines 20 can be an even gate line and each of the second gate lines 22 can be an odd gate line as well.

However, the RC value of the first gate lines 20 and the second gate lines 22 may become different. Since the material of the first gate lines 20 and the second gate lines 22 can be slightly different during the formation of the first gate lines 20 and the second gate lines 22. Further, the length of the first gate lines 20 and the second gate lines 22 from the gate driver 100 to the pixels may not be exactly the same as well.

Figure 3:
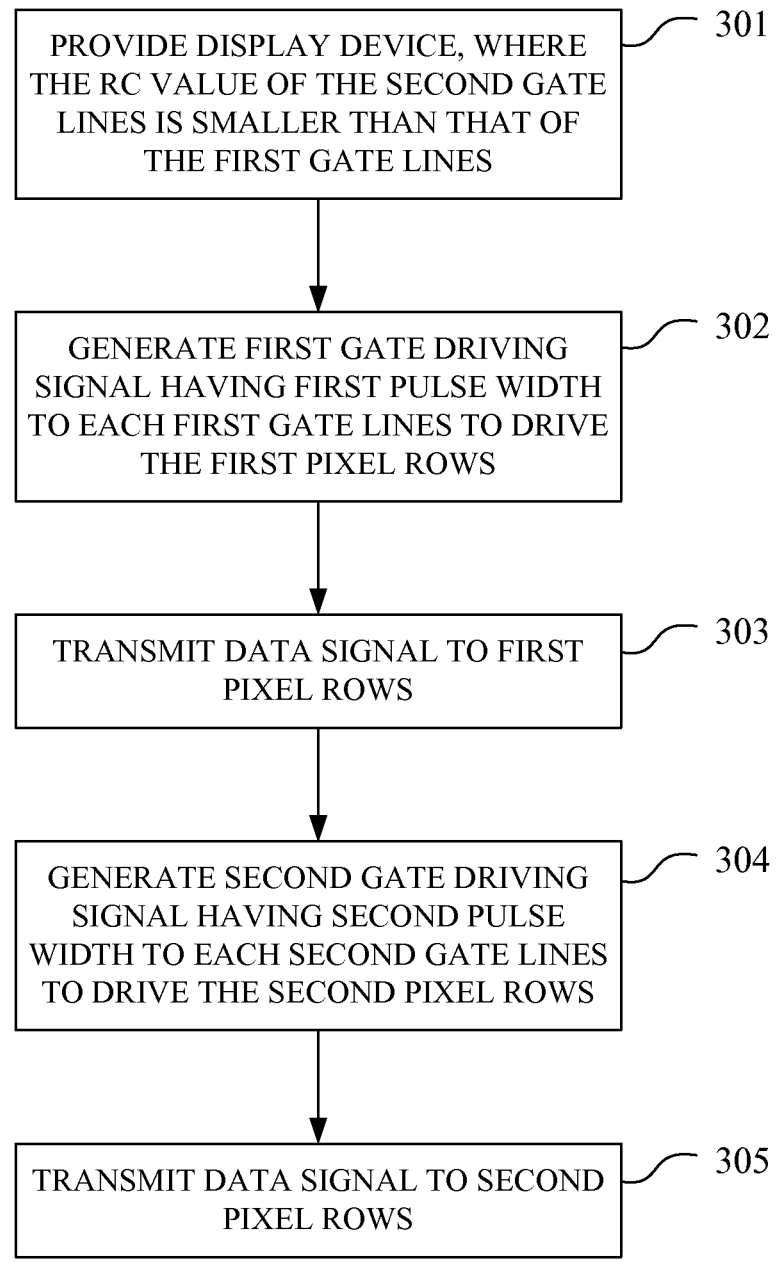
FIG. 3 is a flow chart of a display device driving method in an embodiment of the present disclosure.

FIG. 3 is a flow chart of a display device driving method 300 in an embodiment of the present disclosure. The display device driving method 300 comprises the steps outlined below.

In step 301, the display device 1 as shown in FIG. 1 is provided. In an embodiment, a second RC value of each of the second gate lines is smaller than a first RC value of each of the first gate lines.

In step 302, a first gate driving signal having a first pulse width is generated from the gate driver 100 to each of the first gate lines 20 to drive the corresponding first pixel rows.

In step 303, a data signal is transmitted from the source driver 102 to the first pixel rows.

In step 304, a second gate driving signal having a second pulse width is generated from the gate driver 100 to each of the second gate lines 22 to drive the corresponding second pixel rows, wherein the second pulse width is smaller than the first pulse width.

In step 305, a data signal is transmitted from the source driver 102 to the second pixel rows.

It is noted that the steps 302 to 305 are continuously performed until all the pixel rows are scanned.

Figure 4A:
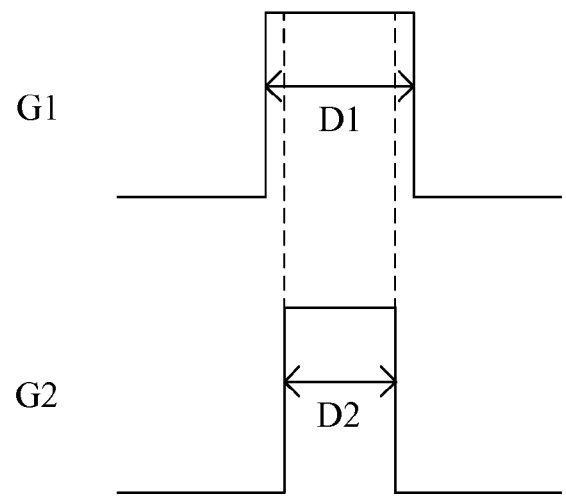
FIG. 4A is a waveform diagram of the first gate driving signal and the second gate driving signal generated from the gate driver.
Figure 4B:
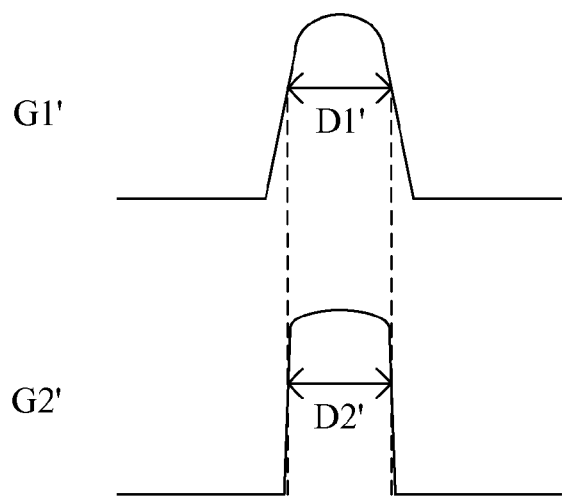
FIG. 4B is a waveform diagram of the first gate driving signal and the second gate driving signal received by the pixel after the transmission in the first and the second gate lines respectively.

FIG. 4A is a waveform diagram of the first gate driving signal G1 and the second gate driving signal G2 generated from the gate driver 100. FIG. 4B is a waveform diagram of the first gate driving signal G1' and the second gate driving signal G2' received by the pixel after the transmission in the first and the second gate lines 20 and 22 respectively. Since the first RC value of the first gate line 20 is larger than the second RC value of the second gate line 22, the first pulse width D1 of the first gate driving signal G1 is larger than the second pulse width D2 of the second gate driving signal G2. After the transmission, the first gate driving signal G1' suffers from larger transmission loss since the first gate line 20 having a larger RC value. Hence, when the pixels on the first pixel rows receive the first gate driving signal G1', the pulse width D1' of the first gate driving signal G1' is about the same as the pulse width D2' of the second gate driving signal G2' that is received by the pixels on the second pixel rows. The length of the time that the first gate driving signal G1' turns on the first pixel rows is about the same as the length of the time that the second gate driving signal G2' turns on the second pixel rows.

Accordingly, the display device driving method can compensate the effect caused by the mismatch of the first and the second gate lines by using different gate driving signals. Hence, the length of the time that the first gate driving signal turns on the first pixel rows is about the same as the length of the time that the second first gate driving signal turns on the second pixel rows.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device driving method comprising:
providing a display device comprising a pixel array and a driving circuit, wherein the driving circuit comprises a plurality of first gate lines connected to a plurality of first pixel rows on the pixel array and a plurality of second gate lines connected to a plurality of second pixel rows on the pixel array, in which each of the first gate lines has a first RC value and each of the second gate lines has a second RC value smaller than the first RC value;
generating a first gate driving signal having a first pulse width to each of the first gate lines to drive the first pixel rows; and
generating a second gate driving signal having a second pulse width to each of the second gate lines to drive the second pixel rows, wherein the second pulse width is smaller than the first pulse width;
wherein the first gate lines and the second gate lines are formed on two different layers on the pixel array.

2. The display device driving method of claim 1, wherein the first RC value and the second RC value are related to a material of the first and the second gate lines.

3. The display device driving method of claim 1, wherein the first RC value and the second RC value are related to a length of the first and the second gate lines.

4. The display device driving method of claim 1, wherein each of the first gate lines is an odd gate lines and each of the second gate lines is an even gate lines.

5. The display device driving method of claim 1, wherein each of the first gate lines is an even gate lines and each of the second gate lines is an odd gate lines.

6. The display device driving method of claim 1, wherein the first and the second gate driving signals are generated from a gate driver of the driving circuit.

7. The display device driving method of claim 1, wherein when the first gate driving signal is generated to each of the first gate lines to drive the first pixel rows, further comprising transmitting a data signal to the first pixel rows from a source driver of the driving circuit.

8. The display device driving method of claim 1, wherein when the second gate driving signal is generated to each of the second gate lines to drive the second pixel rows, further comprising transmitting a data signal to the second pixel rows from a source driver of the driving circuit.

* * * * *